US012645781B2

(12) United States Patent
Taveira et al.

(10) Patent No.: US 12,645,781 B2
(45) Date of Patent: *Jun. 2, 2026

---

(54) AUTHENTICATION OF MEMORY EXPANSION CAPABILITIES

(71) Applicant: DELL PRODUCTS L.P., Round Rock, TX (US)

(72) Inventors: Milton Taveira, Round Rock, TX (US); Isaac Q. Wang, Austin, TX (US); Jordan Chin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/777,120

(22) Filed: Jul. 18, 2024

(65) Prior Publication Data

US 2024/0370546 A1      Nov. 7, 2024

Related U.S. Application Data

(63) Continuation of application No. 17/871,338, filed on Jul. 22, 2022, now Pat. No. 12,124,551.

(51) Int. Cl.
| | |
|---|---|
| *G06F 21/33* | (2013.01) |
| *G06F 21/64* | (2013.01) |
| *G06F 21/85* | (2013.01) |

(52) U.S. Cl.
CPC .............. G06F 21/33 (2013.01); G06F 21/64 (2013.01); G06F 21/85 (2013.01)

(58) Field of Classification Search
CPC .......... G06F 21/33; G06F 21/44; G06F 21/64; G06F 21/85
See application file for complete search history.

(56) References Cited

U.S. PATENT DOCUMENTS

| | | | |
|---|---|---|---|
| 7,938,863 B2 | 5/2011 | Skinner et al. | |
| 10,025,729 B2 | 7/2018 | Bolotin et al. | |
| 12,124,551 B2 * | 10/2024 | Taveira .................. | G06F 21/85 |
| 2004/0143710 A1 | 7/2004 | Walmsley | |
| 2012/0307994 A1 | 12/2012 | Sasaki et al. | |
| 2019/0097810 A1 | 3/2019 | Ghetie et al. | |
| 2022/0318043 A1 | 10/2022 | Liu et al. | |

* cited by examiner

*Primary Examiner* — Boris D Grijalva Lobos
(74) *Attorney, Agent, or Firm* — Larson Newman, LLP

(57) ABSTRACT

A memory module includes first and second data storage locations. The first data storage location stores an expansion license. The memory module operates with a base set of functions, and is configurable to operate with an expanded set of functions based on the expansion license. The second data storage location stores an expansion capability certificate that is signed by an information handling system and includes a subset of the expanded set of functions that are enabled by the expansion capability certificate. The memory module determines that the memory module is installed into the information handling system based on the expansion capability certificate, and enables the subset of the expanded set of functions in response to determining that the memory module is installed into the information handling system.

20 Claims, 3 Drawing Sheets

110

Host Processor

112

Memory Controller

120

Memory Module

130

Configuration Controller

Memory Expansion License Slot
136

Memory Expansion Capability
Certificate Slots
138

MCTP/SPDM Module
134

I2C Interface
132

140

I2C Interface
142

MCTP/SPDM Module
144

Baseboard Management Controller

100

AUTHENTICATION OF MEMORY EXPANSION CAPABILITIES

This application is a Continuation of U.S. patent application Ser. No. 17/871,338 entitled "AUTHENTICATION OF MEMORY EXPANSION CAPABILITIES," filed Jul. 22, 2022, the disclosure of which is hereby expressly incorporated by reference in its entirety.

Related subject matter is contained in co-pending U.S. patent application Ser. No. 17/875,665 entitled "INFORMATION HANDLING SYSTEM CONFIGURED FOR AUTHENTICATION OF MEMORY EXPANSION CAPABILITIES" filed Jul. 28, 2022, the disclosure of which is hereby incorporated by reference.

Related subject matter is contained in co-pending U.S. patent application Ser. No. 17/957,886 entitled "AUTHENTICATION OF MEMORY EXPANSION CAPABILITIES" filed Sep. 30, 2022, the disclosure of which is hereby incorporated by reference.

FIELD OF THE DISCLOSURE

This disclosure generally relates to information handling systems, and more particularly relates to providing authentication of memory expansion capabilities in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A memory module may include a first data storage location to store an expansion license. The memory module may operate with a base set of functions, and may be configurable to operate with an expanded set of functions based on the expansion license. A second data storage location may store an expansion capability certificate that is signed by an information handling system and may include a subset of the expanded set of functions that are enabled by the expansion capability certificate. The memory module may determine that the memory module is installed into the information handling system based on the expansion capability certificate, and may enable the subset of the expanded set of functions in response to determining that the memory module is installed into the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
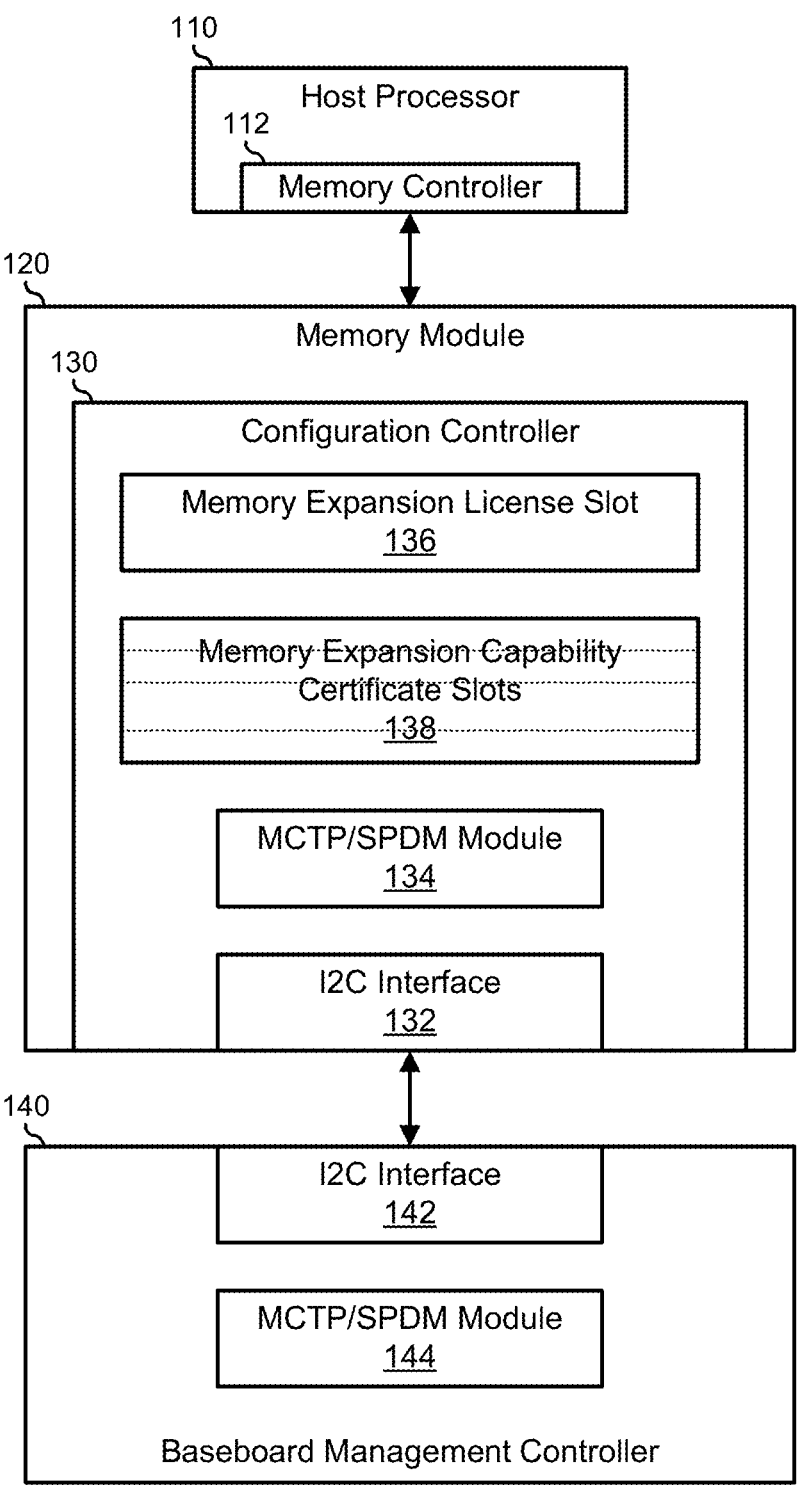
FIG. 1 is a block diagram of an information handling system according to an embodiment of the current disclosure.

FIG. 1 illustrates an information handling system 100 including a host processor 110 connected to a memory module 120, and a baseboard management controller 140. Host processor 110 includes a memory controller 112 that manages transactions between the host processor and memory module 120. Memory controller 112 and memory module 120 are provided in accordance with a particular memory standard, such as a double data rate (DDR) memory standard. An example of a DDR standard includes a third generation DDR standard (DDR3), a fourth generation DDR standard (DDR4), a fifth generation DDR standard (DDR5), or future DDR standards.

Memory module 120 includes a configuration controller 130. Memory module 120 represents a data storage device in a particular form factor, such as a DIMM, a small outline DIMM (SODIMM), an unbuffered DIMM (UDIMM), a registered DIMM (RDIMM), a Load-Reduced DIMM (LRDIMM), a compression attached memory module (CAMM), a solid state drive (SSD), a Compute Express Link (CXL) expansion card, a compact flash card, a PC Card flash card, or another type of memory device form factor. For the purpose of the present disclosure, memory module 120 may represent a volatile memory device, such as a DIMM with dynamic random access memory (DRAM) devices for data storage, a non-volatile memory device, such as a non-volatile DIMM (NVDIMM) of one of various types, such as NVDIMM-F, NVDIMM-N, NVDIMM-P, Intel Optane persistent memory, or the like.

Configuration controller 130 includes an inter-integrated circuit (I2C) interface 132, a management component transport protocol (MCTP)/security protocol and data model (SPDM) module 134, a data storage slot ("MEL slot") 136 for storing a memory expansion license (MEL), and one or more data storage locations for storing memory expansion capability (MEC) certificates 138. Configuration controller 130 represents a device included on memory module 120 that provides a management interface between the memory module and host processor 110 and BMC 140. As such, configuration controller 130 may represent a Serial Presence Detect (SPD) device on a DIMM, a CXL controller on a CXL accelerator or riser card, or another device provided to manage the configuration of memory module 120. I2C interface 132 is connected to an I2C interface 142 of BMC 140. A MCTP/SPDM module 144 of BMC 140. MCTP/SPDM modules 134 and 144 provide a management structure through which information handling system 100 monitors, manages, and maintains the operations of memory module 120. The details of the MCTP and SPDM protocols are known in the art and will not be further described herein, except as needed to illustrate the current embodiments. Note that, as illustrated, Configuration controller 130 includes I2C interface 132. However, it will be understood that Configuration controller 130 may include an Improved Inter-Integrated Circuit (I3C) interface, a Low Pin Count (LPC) interface, a Serial Presence Interface (SPI), or another side-band interface, as needed or desired.

Memory module 120 incorporates tiered data storage functions. For example, memory module 120 may be provided with a common set of basic data storage functions that are understood to be provided as a baseline set of functions, and may further be provided with one or more sets of expansion data storage functions that may be unlocked in to provide additional functions or features, as needed or desired. Examples of expansion functions may include one or more steps of maximum operating frequency levels, one or more steps of increased data storage capacity, increased numbers of memory ranks, improved reliability, availability, and serviceability (RAS) features, error checking and scrubbing (ECS) functions, memory rank sparing, row/column replacement functions and various numbers of spare rows/columns, or other expansion functions, as needed or desired. In general, an locked memory module provides the baseline data storage functions, and a manufacturer of the memory module will provide various mechanisms to unlock various combinations of the expansion functions.

In a particular case, the set of expansion functions are unlocked at a manufacturing site based upon a demand for such expansion functions from an end user of the memory module. The manufacturer may utilize a process to unlock the memory module permanently with the set of expansion functions. For example, a manufacturer of memory module 120 may program MEL slot 136 with information (that is, a MEL) that defines the set of expansion data storage functions that are unlocked in the memory module. In this case, the set of expansion functions will be understood to accrue to any information handling system into which such a memory module is installed, and there is no binding between the information handling system and the memory module. This may be a disadvantage where a user represents a large-scale user of memory modules, such as a data center, where the functions and capabilities of an information handling system are more desirably managed at the system level, rather than the component level.

Further, such a memory module with its expansion functions permanently unlocked at the manufacturing site is not able to be upgraded with greater functionality, and a user's only option to upgrade their memory module is to acquire a new memory module with the desired expansion functions unlocked. A MEL may be understood to represent a bit-field that is utilized by a memory module to control which functions are locked and which functions are unlocked. In another case, a MEL may represent a secure license that encodes which functions are locked and which functions are unlocked. Memory module 120 may include additional logic whereby the information stored in MEL slot 136 is validated prior to the unlocking of the expansion functions specified by the MEL stored in the MEL slot. In either case, MEL slot 136 may be provided in a location that is invisible to host processor 110, or may be provided as a host processor readable read-only register or location, as needed or desired. For example, MEL slot 136 may be located in a SPDM system vendor certificate slot, a protected flash region, or another slot, register, or region of memory module 120, as needed or desired.

In a particular embodiment, information handling system 100 provides a cryptographic framework for locking and unlocking expansion data storage functions within the memory module. BMC 140 operates to create MEC certificates, to install the MEC certificates to one of MEC certificate slots 138, and to monitor, manage, and maintain the MEC certificates stored in the MEC certificate slots. The MEC certificates operate similarly to the MEL, in that the MEC certificates include information that defines the set of expansion data storage functions that are unlocked in the memory module. Where the MEL represents a bit-field that is utilized by a memory module to control which functions are locked and which functions are unlocked, the MEC certificate will include a similar bit-field, and where the MEL represents a secure license that encodes which functions are locked and which functions are unlocked, the MEC will likewise include a similar secure encoded license.

In a particular embodiment, the presence of a MEC certificate stored in one of MEC certificate slots 138 may take precedence over the MEL stored in MEL slot 136, and only the functions specified by the MEC certificate will be unlocked. In this way, where memory module 120 includes only a MEL stored in MEL slot 136, and no MEC certificates stored in one of MEC certificate slots 138, the memory module may retain the unlocked functionality specified by the MEL, regardless of the information handling system in which the memory module is installed. Further, where a MEC certificate is stored in one of MEC certificate slots 138, memory module 120 can be cryptographically bound to information handling system 100, such that the functions unlocked by the MEC certificate are only unlocked in the memory module when the memory module is installed into information handling system 100.

In a particular case, memory module 120 may include all functionality unlocked by both the MEL and the MEC certificate. On the other hand, where a MEC certificate is stored in one of MEC certificate slots 138, but memory module 120 is installed into another information handling system, the cryptographic binding of the MEC certificate to information handling system 100 is not established, and the memory module reverts to the functions unlocked by the MEL. MEC slots 138 may be provided in a location that is invisible to host processor 110, or may be provided as a host processor readable read-only register or location, as needed or desired. For example, MEC slots 138 may be located in a SPDM system vendor certificate slot, a protected flash region, or another slot, register, or region of memory module 120, as needed or desired.

Figure 2:
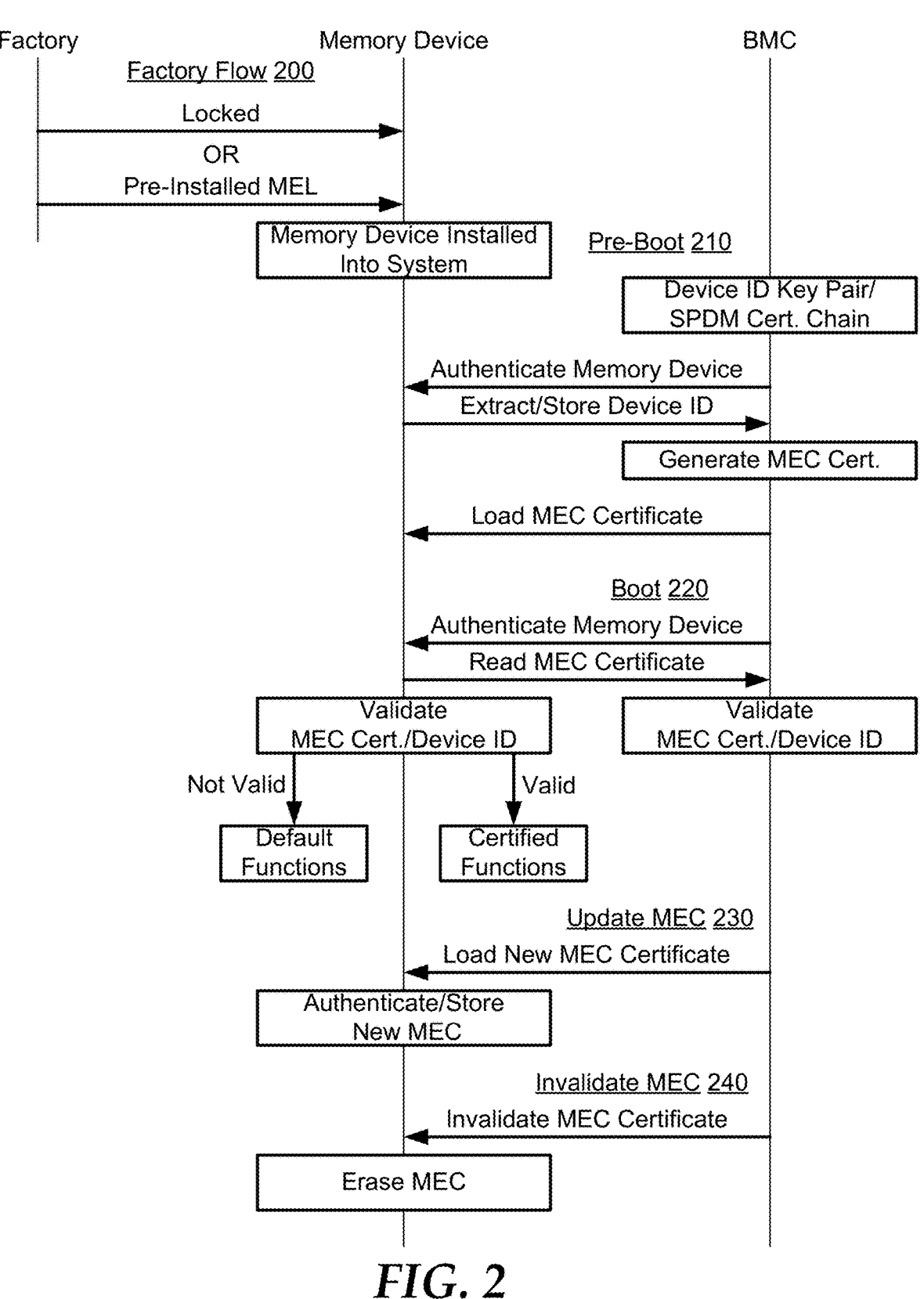
FIG. 2 illustrates a method for providing authentication of memory expansion capabilities in an information handling system according to an embodiment of the current disclosure.

FIG. 2 illustrates a method for authentication of memory device expansion capabilities in a memory module such as memory module 120, starting with a factory flow 200. The memory module may be provided from the manufacturer in one of two (2) configurations. In the first configuration, no MEL is installed into a MEL slot of the memory module. In this case, the memory module is completely locked and no expansion functions of the memory module are provided by the memory module. The memory module is provided with only the baseline functions. In the second configuration, the manufacturer installs a MEL into the MEL slot. In this case, the memory module operates with the expansion functions unlocked by the MEL. After the memory module is configured by the manufacturer, the memory module is installed into an information handling system. The method as illustrated herein does not encompass the steps taken where the information handling system includes no BMC, or where a BMC of the information handling system is not programmed to perform the operations as specified in the current method. In such cases, the memory module will exhibit the functions as dictated by the presence or absence of a MEL, as described.

A pre-boot flow 210 is initiated when a BMC is provisioned with a SPDM certification chain, generates a MEC key pair, and stores the MEC private key in immutable memory of the BMC. Because the BMC operates out of band from a host processor of the information handling system, the BMC can then authenticate the memory module through the SPDM protocol, and then extract and store the uni.que device identifier (Device ID) of the memory module to the immutable memory of the BMC. The unique device identifier (Device ID) of the memory module may include a manufacture's identifier, such as a data code or serial number, or a SPDM leaf certification public key, as needed or desired. The BMC then generates a MEC certificate associated with the memory module. The information handling system, and in particular the BMC of the information handling system, has rights to the enabling of various sets of the expansion functions of memory modules installed thereon.

For example, a data center may obtain the rights to enable a particular set of expansion functions on memory modules within the information handling systems within the data center. Here, a data center management system may endow the rights to the individual BMCs in the information handling systems within the data center. As such, the MEC certificate created by the BMC will include 1) the MEC public key, 2) information to uniquely identify the memory module and the BMC, such as a hash of the unique device identifier and a unique BMC identifier, and 3) a list of the expansion functions to be unlocked by the MEC certificate. Finally, the BMC stores the MEC certificate to a MEC certificate slot of the memory module, and pre-boot flow 210 is finished.

In a particular embodiment, a MEL may not include particular expansion functions which are specifically unlocked in a particular memory module. Rather, here, the existence of a MEL in a MEL slot of a memory module may indicate that the memory module is enabled to have expansion functions unlocked in the first instance. That is, here the absence of a MEL in a MEL slot of a memory module may operate to relegate that memory module to only the base functionality, with no ability to unlock any expansion functions at all. Prior to creating the MEC certificate, as described above, a BMC of an information handling system may first check for the presence of a MEL in the MEL slot of a memory module. Then, if no MEL is present, then the BMC does not generate a MEC certificate, and the memory module is operated with only the base functions.

A boot flow 220 is initiated when the information handling system is booted. The BMC authenticates the memory module by 1) reading the MEC certificate via a SPDM command and checking the authenticity of the MEC certificate by verifying that the root Certificate Authority is trusted and identifies the memory module public key in the leaf certificate and the memory module unique identifier (Device ID), sending a Challenge-Response SPDM command to the memory module, 3) receiving a response signed with the memory module private key, and 4) decrypting the signed response with the memory module public key. If the response matches, the BMC confirms that the memory module carries the corresponding memory module private key, and trust is established with the memory module, confirming that the present memory module is bound to the BMC.

Further, the memory module operates to compare the Device ID public key from the MEC certificate with the leaf certificate public key received from the BMC to verify that the memory module is installed into the information handling system to which it was bound by the MEC certificate. Here, the memory module 1) issues its own SPDM Challenge-Response command to the BMC, 2) receives a response signed with the BMC private key, and decrypts the signed response with the BMC public key. If the response matches, the memory module confirms that the BMC carries the corresponding BMC private key, and trust is established with the BMC, confirming that the information handling system is the system to which the memory module is bound.

If the BMC is mismatched with the memory module, then the memory module will have been moved from the information handling system that provisioned the memory module with the MEC certificate. In this case, the BMC may reprovision the memory module with a new MEC certificate, as described further below. However, until such time that the memory module is reprovisioned with a new MEC certificate, the memory device operates with the base functions only. When the BMC and the memory module identified in the MEC certificate match, the memory module operates to unlock the expansion functions identified by the MEC certificate.

A MEC certificate update flow 230 is initiated when the BMC is provisioned with new expansion functions for the memory module. For example, the data center that includes the information handling system may have obtained an increased set of expansion functions for the memory modules in the data center, or a previous license to the current set of expansion functions may have expired, and been replaced by a decreased set of expansion functions. The BMC sends a MEC certificate update command that is signed with the MEC private key to the memory module. The MEC certificate update command includes an updated MEC certificate. When the memory module authenticates the MEC certificate update command, then the memory module stores the updated MEC certificate in a new MEC certificate slot and begins to utilize the updated MEC certificate. If no additional MEC certification slot is available, the memory module operates to evict the oldest resident MEC certificate to free up a MEC certificate slot and stores the updated MEC certificate in the freed slot. By having to authenticate the updated MEC certificate, the memory module must first authenticate the MEC certificate update command to ensure that only the BMC to which the memory module is bound can update the MEC certificate.

A MEC certificate invalidation flow 240 is initiated when the BMC is set to invalidate the MEC certificate in the memory module. The BMC sends a MEC certificate invalidate command that is signed with the MEC private key to the memory module. The MEC certificate invalidate command does not include any updated MEC certificate, but merely directs the memory module to invalidate the existing MEC certificate. When the memory module authenticates the MEC certificate invalidate command, then the memory module invalidates the current MEC The memory module must authenticate the MEC certificate invalidate command to ensure that only the BMC to which the memory module is bound can invalidate the MEC certificate. After the MEC certificate is invalidated, the memory module returns to the base functions, with all of the expansion functions locked.

The functions of a memory module with respect to expansion functions, and the creation of MEC certificates, and the monitoring, managing, and maintaining of the MEC certificates to enable the expansion functions, as described above, were illustrated in the context of a BMC of an information handling system. However, the use of the BMC is not required to provide the functions and features of the current embodiments. In particular, it will be understood that a typical information handling system may include a side-band interface between a host processor of the information handling system and a memory module of the information handling system. As such, the flows as described with regard to FIG. 2 may be understood to be subject to performance by the host processor, or another processor of the information handling system, as needed or desired.

Figure 3:
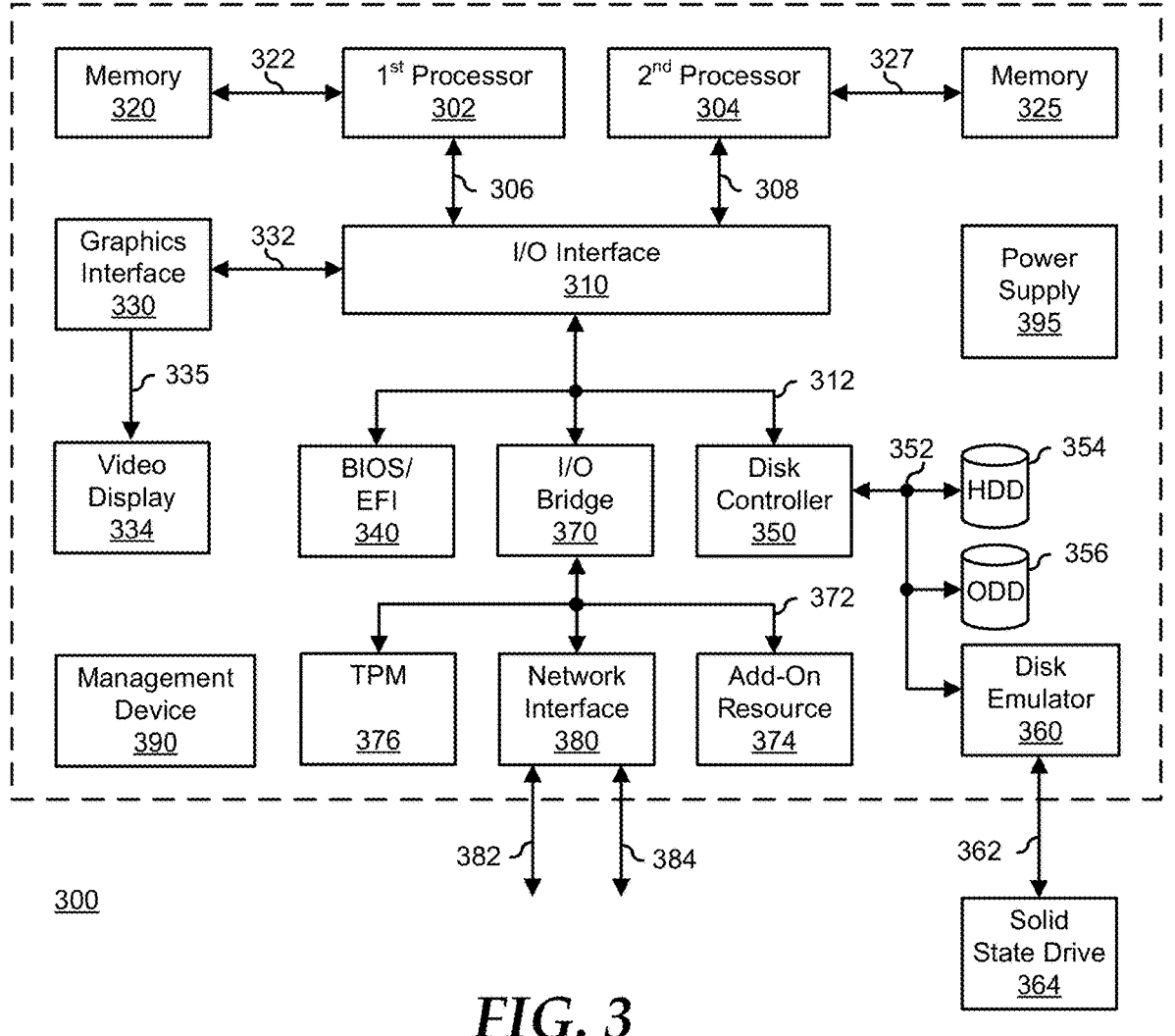
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A memory module, comprising:
a first data storage location to store an expansion license, wherein the memory module operates with a base set of functions, and is configurable to operate with an expanded set of functions based on the expansion license; and
a second data storage location to store a first expansion capability certificate, wherein the memory module is configured to determine that the memory module is installed into a first information handling system based on the first expansion capability certificate.

2. The memory module of claim 1, wherein the first expansion capability certificate includes a first unique identifier associated with the first information handling system.

3. The memory module of claim 2, wherein, in determining that the memory module is installed into the first information handling system, the memory module is further configured to determine that a second unique identifier received by the memory module matches the first unique identifier.

4. The memory module of claim 2, wherein the memory module is further configured to determine that the memory module is installed into a second information handling system.

5. The memory module of claim 4, wherein, in determining that the memory module is installed into the second information handling system, the memory module is further configured to determine that a third unique identifier received by the memory module does not match the first unique identifier.

6. The memory module of claim 5, wherein the memory module is further configured to disable a first subset of the expanded set of functions that are enabled by the first expansion capability certificate, and to operate with only the base set of functions in response to determining that the third unique identifier does not match the first unique identifier.

7. The memory module of claim 1, wherein the memory module is further configured to receive a second expansion capability certificate, the second expansion capability certificate being signed by the first information handling system and including a second subset of the expanded set of functions that are enabled by the second expansion capability certificate, and to store the second expansion capability subset in a third data storage location.

8. The memory module of claim 7, wherein the memory module is further configured to redetermine that the memory module is installed into the first information handling system based on the first expansion capability certificate, and to enable the second subset of the expanded set of functions in response to redetermining that the memory module is installed into the first information handling system.

9. The memory module of claim 1, wherein the expanded set of functions includes at least one of a maximum operating frequency of the memory module, an increased data storage capacity of the memory module, an increased numbers of memory ranks of the memory module, an error checking and scrubbing function on the memory module, a memory rank sparing function on the memory module, a row or column replacement function on the memory module, and a number of spare rows or columns of the memory module.

10. The memory module of claim 1, further comprising an inter-integrated circuit (I2C) interface, wherein the memory module receives the second expansion capability certificate via the I2C interface.

11. A method comprising:
providing, on a memory module, a first data storage location to store an expansion license, wherein the memory module operates with a base set of functions, and is configurable to operate with an expanded set of functions based on the expansion license;
providing, on the memory module, a second data storage location to store a first expansion capability certificate; and
determining that the memory module is installed into the first information handling system based on the first expansion capability certificate.

12. The method of claim 11, wherein the first expansion certificate includes a first unique identifier associated with the first information handling system.

13. The method of claim 12, wherein in determining that the memory module is installed into the first information handling system, the method further comprises determining that a second unique identifier received by the memory module matches the first unique identifier.

14. The method of claim 12, further comprising determining that the memory module is installed into a second information handling system.

15. The method of claim 14, wherein in determining that the memory module is installed into the second information handling system, the method further comprises determining that a third unique identifier received by the memory module does not match the first unique identifier.

16. The method of claim 15, further comprising:
disabling a first subset of the expanded set of functions that are enabled by the first expansion capability certificate; and
operating the memory module with only the base set of functions in response to determining that the third unique identifier does not match the first unique identifier.

17. The method of claim 11, further comprising:
receiving a second expansion capability certificate, the second expansion capability certificate being signed by the first information handling system and including a second subset of the expanded set of functions that are enabled by the second expansion capability certificate; and
storing the second expansion capability subset in a third data storage location.

18. The method of claim 17, further comprising:
redetermining that the memory module is installed into the first information handling system based on the first expansion capability certificate; and
enabling the second subset of the expanded set of functions in response to redetermining that the memory module is installed into the first information handling system.

19. The method of claim 11, wherein the expanded set of functions includes at least one of a maximum operating frequency of the memory module, an increased data storage capacity of the memory module, an increased numbers of memory ranks of the memory module, an error checking and scrubbing function on the memory module, a memory rank sparing function on the memory module, a row or column replacement function on the memory module, and a number of spare rows or columns of the memory module.

20. A memory module, comprising:
a first data storage location to store an expansion license, wherein the memory module operates with a base set of functions, and is configurable to operate with an expanded set of functions based on the expansion license; and
a second data storage location to store a first expansion capability certificate, the first expansion capability certificate being signed by a first information handling system;
wherein the memory module is configured to determine that the memory module is installed into the first information handling system based on the first expansion capability certificate, and to enable a first subset of the expanded set of functions that are enabled by the first expansion capability certificate in response to determining that the memory module is installed into the first information handling system.

* * * * *